(12) United States Patent
Wu (10) Patent No.: US 10,219,133 B2
(45) Date of Patent: Feb. 26, 2019

(54) NOTIFICATION MESSAGE TRANSMISSION METHOD AND DEVICE, AND COMPUTER STORAGE MEDIUM

(71) Applicant: ZTE CORPORATION, Shenzhen (CN)

(72) Inventor: Hao Wu, Shenzhen (CN)

(73) Assignee: XI'AN ZHONGXING NEW SOFTWARE CO., LTD, Shaanxi (CN)

(*) Notice: Subject to any disclaimer, the term of this patent is extended or adjusted under 35 U.S.C. 154(b) by 83 days.

(21) Appl. No.: 15/320,521

(22) PCT Filed: Aug. 21, 2014

(86) PCT No.: PCT/CN2014/084939
§ 371 (c)(1),
(2) Date: Dec. 20, 2016

(87) PCT Pub. No.: WO2015/192466
PCT Pub. Date: Dec. 23, 2015

(65) Prior Publication Data
US 2017/0164138 A1   Jun. 8, 2017

(30) Foreign Application Priority Data
Jun. 20, 2014   (CN) .......................... 2014 1 0283183

(51) Int. Cl.
*H04J 3/00*   (2006.01)
*H04W 4/70*   (2018.01)
(Continued)

(52) U.S. Cl.
CPC ............ *H04W 4/70* (2018.02); *G06F 21/554* (2013.01); *H04W 68/00* (2013.01);
(Continued)

(58) Field of Classification Search
CPC ....................................................... H04W 4/70
See application file for complete search history.

(56) References Cited

U.S. PATENT DOCUMENTS 8,942,739 B2    1/2015  Kannan et al.
2014/0215043 A1* 7/2014  Ryu ........................ H04W 4/70
                                                          709/223
(Continued)

FOREIGN PATENT DOCUMENTS

CN    1859363      11/2006
CN    101529804    9/2009
(Continued)

OTHER PUBLICATIONS

Machine-to-Machine communications (M2M); mla, dla and mid interfaces; ETSI Draft; TS_102 921 V2.2.0, European Telecommunications Standards Institute (ETSI), May 7, 2014 (May 7, 2014), pp. 1-621, X P014184395.*
(Continued)

*Primary Examiner* — Chi H Pham
*Assistant Examiner* — Fahmida S Chowdhury
(74) *Attorney, Agent, or Firm* — Plumsea Law Group, LLC (57) ABSTRACT

A notification message sending method and device and a computer storage medium are described. The method includes: acquiring target resource information, a notification sending policy and a notification sending address; generating a corresponding notification message when a target resource changes; and sending the notification message to the notification sending address according to the notification sending policy. The device includes: an acquisition module arranged to acquire target resource information, a notification sending policy and a notification sending address; a generation module arranged to generate a corresponding notification message when a target resource (Continued)

changes; and a sending module arranged to send the notification message to the notification sending address according to the notification sending policy.

5 Claims, 2 Drawing Sheets (51) Int. Cl.
H04W 68/00 (2009.01)
H04W 72/04 (2009.01)
G06F 21/55 (2013.01)
G06F 9/54 (2006.01)

(52) U.S. Cl.
CPC ..... *H04W 72/048* (2013.01); *H04W 72/0446* (2013.01); *G06F 9/542* (2013.01); *G06F 2221/033* (2013.01)

(56) References Cited

U.S. PATENT DOCUMENTS

| | | | | |
|---|---|---|---|---|
| 2014/0351312 A1* | 11/2014 | Lu | ............................ | H04W 4/70 709/201 |
| 2014/0351592 A1* | 11/2014 | Starsinic | ................. | H04W 4/70 713/168 |
| 2014/0359131 A1* | 12/2014 | Seed | ....................... | H04W 4/70 709/226 |
| 2016/0219125 A1 | 7/2016 | Xiao | | |

FOREIGN PATENT DOCUMENTS

| | | |
|---|---|---|
| CN | 102752331 | 10/2012 |
| CN | 103618800 | 3/2014 |

OTHER PUBLICATIONS

International Search Report for PCT/CN2014/084939, English Translation attached to original, Both completed by the Chinese Patent Office on Mar. 2, 2015, All together 6 Pages.

Extend European Search Report for EP 14894958.9, completed by the European Patent Office dated Jun. 7, 2017 All together 6 Pages.

ETSI TS 102 921 V2.2.0 (May 2014), Technical Specification, Machine-to-Machine communications (M2M); mla, dla and mld interfaces.

* cited by examiner

NOTIFICATION MESSAGE TRANSMISSION METHOD AND DEVICE, AND COMPUTER STORAGE MEDIUM

CROSS-REFERENCE TO RELATED APPLICATIONS

This application is the U.S. national phase of PCT Application No. PCT/CN2014/084939 filed on Aug. 21, 2014, which claims priority to Chinese Patent Application No. 201410283183.2 filed on Jun. 20, 2014, the disclosures of which are incorporated in their entirety by reference herein.

TECHNICAL FIELD

The present document relates to a Machine Type Communication MTC technology, in particular to a notification message sending method and device and a computer storage medium.

BACKGROUND

A Machine to Machine M2M communication network includes various M2M nodes and a bearer network. The M2M nodes implement mutual communication through the bearer network. One M2M node at least includes an Application Entity AE or a Common Service Entity CSE.

Figure 1:
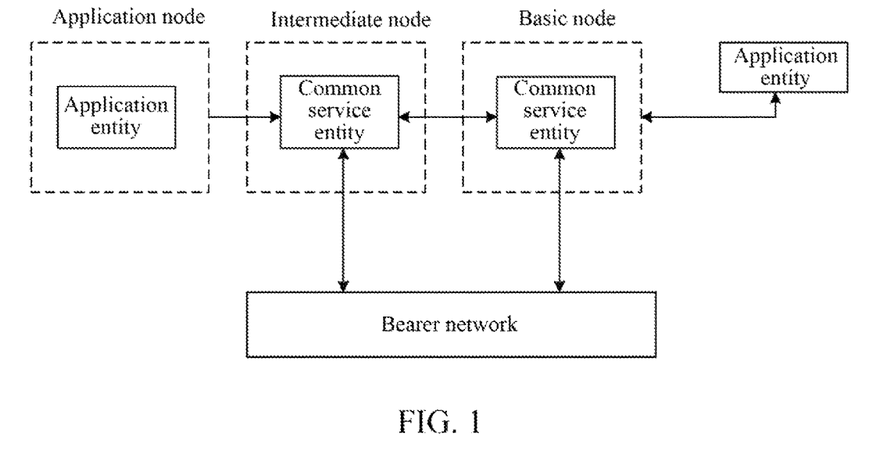
FIG. 1 illustrates a schematic diagram of an M2M system architecture.

An M2M system architecture is as illustrated in FIG. 1. Herein, the application entity is a logic unit which actually executes an M2M application, while the common service entity is a logic unit which manages and serves the application.

In an M2M system architecture, an application node is an execution node at a terminal end, such as an intelligent electricity meter, a temperature measurement and control sensor, a fire alarm or an intelligent domestic electrical appliance and so on. An intermediate node is an intermediate which connects the execution node at the terminal end to a network-side server, such as a gateway. And a basic node is the network-side server, herein the application entity which is registered to the basic node usually is management software or a management platform of an M2M service provider.

Communication between M2M applications is implemented through interaction between CSEs. The communication is based on a premise that the M2M applications firstly need to be registered to local CSEs (e.g., an application entity at an application node in FIG. 1 needs to be registered to a CSE at an intermediate node, and the CSE at the intermediate node is a local CSE of the application entity at the application node), and then interaction between the M2M applications can be implemented through communication between CSEs.

The application node is a physical entity. The AE is a logic unit which actually executes an application at the physical entity, i.e., the application node.

When the AE is registered to the local CSE, the AE needs to provide a security certificate which can identify validity thereof to provide the security certificate to the local CSE for verification. The AE cannot be registered to the local CSE unless the verification passes. At the same time, the AE further needs to provide a registration name recommended by the AE to the local CSE for reference.

The registered AE may also create a resource related to the application at the local CSE, and the resource is used as a sub-resource of an application resource. For example, after the AE is registered, the local CSE will create a resource "application", the application may also create a resource "container" under the resource "application" in order to save the data of the application, and the resource "container" is used for storing the data related to the AE. The AE may acquire a message indicating whether a certain resource changes by means of subscription. When an attribute or a sub-resource of the subscribed resource changes, e.g., a value of the attribute is modified, the sub-resource is deleted or a sub-resource is newly created or the like, the CSE at which the resource is located may send a notification message to the AE to notify the AE about that the concerned resource has already been modified.

The subscription of the resource is implemented by the AE creating a sub-resource with a type "subscription" under a resource to which the CSE expects to subscribe.

The resource to which the AE subscribed may include relatively many attributes and sub-resources, and thus a situation that these attributes and sub-resources are frequently modified may occur. However, according to the current subscription rule in the related art, a notification message will be sent to the AE at each time of modification, resulting in that the AE may frequently receive a great number of notification messages, which is not beneficial to the user experience and wastes the system resources.

SUMMARY

In view of that, in order to solve the technical problems existing in the related art, an embodiment of the present document provides:

a notification message sending method, including:

acquiring target resource information, a notification sending policy and a notification sending address;

generating a corresponding notification message when a target resource changes; and sending the notification message to the notification sending address according to the notification sending policy.

Alternatively, the notification sending policy includes one or more of the following: a notification sending mode, a number of notifications and a notification time length.

Alternatively, the notification sending mode is a normal mode, and said sending the notification message to the notification sending address according to the notification sending policy includes:

when the number of notifications and the notification time length are not empty, judging whether a number of notification messages sent in a current time window exceeds the number of notifications, and if no, sending the notification message; and if yes, sending the notification message in a next time window, herein a length of the time window is the notification time length.

Alternatively, after generating the corresponding notification message, the method further includes: storing the notification message.

Alternatively, the notification sending mode is a latest notification sending mode, and said sending the notification message to the notification sending address according to the notification sending policy includes:

when the number of notifications and the notification time length are not empty, judging whether a number of saved notification messages is not smaller than the number of notifications, and judging whether saving time of the notification messages is not smaller than the notification time length, and if the number of the saved notification messages is not smaller than the number of notifications or the saving time of the notification messages is not smaller than the notification time length, sending a latest generated notification message in the saved notification messages; or when the number of notifications is not empty but the notification time length is empty, judging whether a number of saved notification messages is not smaller than the number of notifications, and if the number of the saved notification messages is not smaller than the number of notifications, sending a latest generated notification message in the saved notification messages; or when the notification time length is not empty but the number of notifications is empty, judging whether saving time of notification messages is not smaller than the notification time length, and if the saving time of the notification messages is not smaller than the notification time length, sending a latest generated notification message in the saved notification messages.

Alternatively, the notification sending mode is a batch-processing sending mode, and said sending the notification message to the notification sending address according to the notification sending policy includes:

when the number of notifications and the notification time length are not empty, judging whether a number of saved notification messages is not smaller than the number of notifications, and judging whether saving time of the notification messages is not smaller than the notification time length, and if the number of the saved notification messages is not smaller than the number of notifications or the saving time of the notification messages is not smaller than the notification time length, sending the saved notification messages; or when the number of notifications is not empty but the notification time length is empty, judging whether a number of saved notification messages is not smaller than the number of notifications, and if the number of the saved notification messages is not smaller than the number of notifications, sending the saved notification messages; or when the notification time length is not empty but the number of notifications is empty, judging whether saving time of notification messages is not smaller than the notification time length, and if the saving time of the notification messages is not smaller than the notification time length, sending the saved notification messages.

Alternatively, the method is applied to a Common Service Entity, CSE, and said acquiring target resource information, a notification sending policy and a notification sending address includes:

acquiring, by the CSE, the target resource information, the notification sending policy and the notification sending address from a subscribed resource creation request sent by an Application Entity, AE, or another CSE.

A notification message sending device includes: an acquisition module, a generation module and a sending module, herein, the acquisition module is arranged to acquire target resource information, a notification sending policy and a notification sending address;

the generation module is arranged to generate a corresponding notification message when a target resource changes; and the sending module is arranged to send the notification message to the notification sending address according to the notification sending policy.

Alternatively, the notification sending policy acquired by the acquisition module includes one or more of the following: a notification sending mode, a number of notifications and a notification time length.

Alternatively, the notification sending mode is a normal mode, and the sending module is specifically arranged to, when the number of notifications and the notification time length are not empty, judge whether a number of notification messages sent in a current time window exceeds the number of notifications, and if no, send the notification message; and if yes, send the notification message in a next time window, herein a length of the time window is the notification time length.

Alternatively, the device further includes a saving module, and the saving module is arranged to save the notification message generated by the generation module.

Alternatively, the notification sending mode is a latest notification sending mode, and the sending module is specifically arranged to, when the number of notifications and the notification time length are not empty, judge whether a number of saved notification messages is not smaller than the number of notifications, and judge whether saving time of the notification messages is not smaller than the notification time length, and if the number of the saved notification messages is not smaller than the number of notifications or the saving time of the notification messages is not smaller than the notification time length, send a latest generated notification message in the saved notification messages; or when the number of notifications is not empty but the notification time length is empty, judge whether a number of saved notification messages is not smaller than the number of notifications, and if the number of the saved notification messages is not smaller than the number of notifications, send a latest generated notification message in the saved notification messages; or when the notification time length is not empty but the number of notifications is empty, judge whether saving time of notification messages is not smaller than the notification time length, and if the saving time of the notification messages is not smaller than the notification time length, send a latest generated notification message in the saved notification messages.

Alternatively, the notification sending mode is a batch-processing sending mode, and the sending module is specifically arranged to, when the number of notifications and the notification time length are not empty, judge whether a number of saved notification messages is not smaller than the number of notifications, and judge whether saving time of the notification messages is not smaller than the notification time length, and if the number of the saved notification messages is not smaller than the number of notifications or the saving time of the notification messages is not smaller than the notification time length, send the saved notification messages; or when the number of notifications is not empty but the notification time length is empty, judge whether a number of saved notification messages is not smaller than the number of notifications, and if the number of the saved notification messages is not smaller than the number of notifications, send the saved notification messages; or when the notification time length is not empty but the number of notifications is empty, judge whether saving time of notification messages is not smaller than the notification time length, and if the saving time of the notification messages is not smaller than the notification time length, send the saved notification messages.

Alternatively, the device is arranged at a CSE, and the acquisition module is arranged to acquire the target resource information, the notification sending policy and the notification sending address from a subscribed resource creation request sent by an AE or another CSE.

A computer storage medium stores computer-executable instructions used for implementing the notification message sending method.

According to the notification message sending method and device and the computer storage medium provided by the embodiments of the present document, target resource information, a notification sending policy and a notification sending address are acquired. A corresponding notification message is generated when a target resource changes. The notification message is sent to the notification sending address according to the notification sending policy. According to the technical solution provided by the embodiments of the present document, notification messages can be sent according to actual demands of users or specific scenarios, the notification message does not need to be sent to a related terminal at each time of modification, thereby the user experience can be improved and the system resources can be saved.

SPECIFIC EMBODIMENTS

In various embodiments of the present document, target resource information, a notification sending policy and a notification sending address are acquired; a corresponding notification message is generated when a target resource changes; and the notification message is sent to the notification sending address according to the notification sending policy.

The technical solution of the present document will be further described below in detail through specific embodiments.

Embodiment 1

Figure 2:
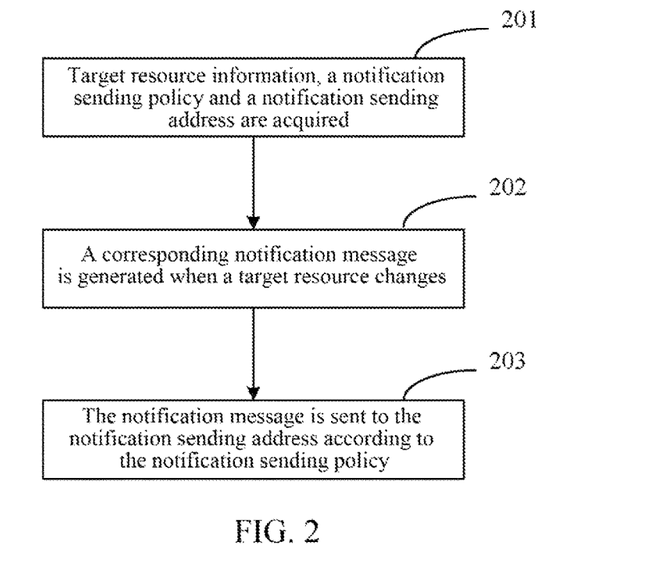
FIG. 2 illustrates a flowchart of a notification message sending method according to embodiment 1 of the present document.

FIG. 2 illustrates a flowchart of a notification message sending method according to embodiment 1 of the present document. As illustrated in FIG. 1, the method includes the following steps.

In step 201, target resource information, a notification sending policy and a notification sending address are acquired.

In this embodiment, the notification sending policy includes one or more of the following: a notification sending mode, a number of notifications and a notification time length. The notification sending mode may be a normal mode, a latest notification sending mode or a batch-processing sending mode.

In step 202, a corresponding notification message is generated when a target resource changes.

In step 203, the notification message is sent to the notification sending address according to the notification sending policy.

It needs to be stated that, when the notification sending module is the normal mode, sending the notification message to the notification sending address according to the notification sending policy in step 203 includes the following contents.

When the number of notifications and the notification time length are empty, the notification message is directly sent.

When the number of notifications and the notification time length are not empty, it is judged whether a number of notification messages sent in a current time window exceeds the number of notifications. If no, the notification message is sent. If yes, the notification message is sent in a next time window. Herein, a length of the time window is the notification time length.

Alternatively, after the corresponding notification message is generated in step 202, the method further includes that the notification message is stored.

It needs to be stated that, when the notification sending mode is the latest notification sending mode, sending the notification message to the notification sending address according to the notification sending policy in step 203 includes the following contents.

When the number of notifications and the notification time length are not empty, it is judged whether a number of saved notification messages is not smaller than the number of notifications, and whether saving time of the notification messages is not smaller than the notification time length. If the number of the saved notification messages is not smaller than the number of notifications, or the saving time of the notification messages is not smaller than the notification time length, a latest generated notification message in the saved notification messages is sent.

Or, when the number of notifications is not empty but the notification time length is empty, it is judged whether a number of saved notification messages is not smaller than the number of notifications. If the number of the saved notification messages is not smaller than the number of notifications, a latest generated notification message in the saved notification messages is sent.

Or, when the notification time length is not empty but the number of notifications is empty, it is judged whether saving time of notification messages is not smaller than the notification time length. If the saving time of the notification messages is not smaller than the notification time length, a latest generated notification message in the saved notification messages is sent.

Or, when the number of notifications and the notification time length are empty, the notification message is sent.

It needs to be stated that, when the notification sending mode is the batch-processing sending mode, sending the notification message to the notification sending address according to the notification sending policy in step 203 includes the following contents.

When the number of notifications and the notification time length are not empty, it is judged whether a number of saved notification messages is not smaller than the number of notifications, and whether saving time of the notification messages is not smaller than the notification time length. If the number of the saved notification messages is not smaller than the number of notifications, or the saving time of the notification messages is not smaller than the notification time length, the saved notification messages are sent.

Or, when the number of notifications is not empty but the notification time length is empty, it is judged whether a number of saved notification messages is not smaller than the number of notifications. If the number of the saved notification messages is not smaller than the number of notifications, the saved notification messages are sent.

Or, when the notification time length is not empty but the number of notifications is empty, it is judged whether saving time of notification messages is not smaller than the notification time length. If the saving time of the notification messages is not smaller than the notification time length, the saved notification messages are sent.

Or, when the number of notifications and the notification time length are empty, the notification message is sent.

It needs to be stated that the method according to the embodiment of the present document may be applied to a CSE.

Correspondingly, acquiring target resource information, a notification sending policy and a notification sending address includes that:

the CSE acquires the target resource information, the notification sending policy and the notification sending address from a subscribed resource creation request sent by an AE or another CSE.

In the present document, by adding a series of parameters related to notification messages to control the sending of notification messages, the terminal may flexibly select a mode of receiving notification messages according to its demands (e.g., the terminal does not expect to frequently receive notification messages, or it does not expect to receive a great number of notification messages since storage spaces of a physical device at which the AE is located are limited, etc.).

Embodiment 2

Figure 3:
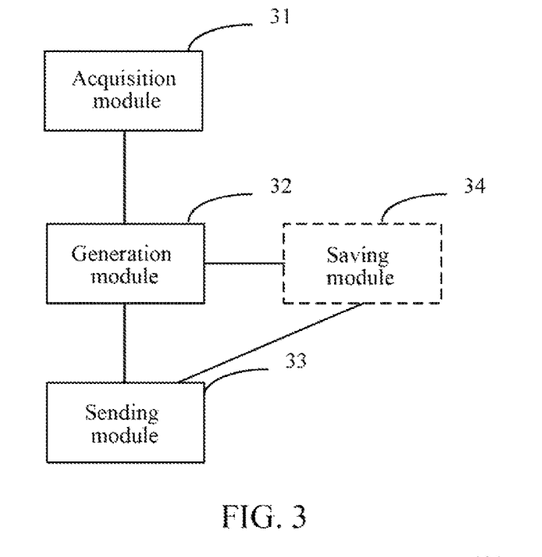
FIG. 3 illustrates a structural schematic diagram of a notification message sending device according to embodiment 2 of the present document.

FIG. 3 illustrates a structural schematic diagram of a notification message sending device according to embodiment 2 of the present document. The device corresponds to the method according to embodiment 1. As illustrated in FIG. 3, the device includes an acquisition module 31, a generation module 32 and a sending module 33.

The acquisition module 31 is arranged to acquire target resource information, a notification sending policy and a notification sending address. Herein, the notification sending policy acquired by the acquisition module includes one or more of the following: a notification sending mode, a number of notifications and a notification time length. Herein, the notification sending mode may be a normal mode, a latest notification sending mode or a batch-processing sending mode.

The generation module 32 is arranged to generate a corresponding notification message when a target resource changes.

The sending module 33 is arranged to send the notification message to the notification sending address according to the notification sending policy.

When the notification sending mode is the normal mode, the sending module 33 is specifically arranged to, when the number of notifications and the notification time length are empty, directly send the notification message. Or the sending module 33 is specifically arranged to, when the number of notifications and the notification time length are not empty, judge whether a number of notification messages sent in a current time window exceeds the number of notifications. If no, the sending module 33 sends the notification message. If yes, the sending module 33 sends the notification message in a next time window. Herein, a length of the time window is the notification time length.

Alternatively, the device further includes a saving module 34.

The saving module 34 is arranged to save the notification message generated by the generation module 33.

When the notification sending mode is the latest notification sending mode, the sending module 33 is specifically arranged to, when the number of notifications and the notification time length are not empty, judge whether a number of saved notification messages is not smaller than the number of notifications, and judge whether saving time of the notification messages is not smaller than the notification time length. If the number of the saved notification messages is not smaller than the number of notifications, or the saving time of the notification messages is not smaller than the notification time length, the sending module 33 sends a latest generated notification message in the saved notification messages. Or, when the number of notifications is not empty but the notification time length is empty, the sending module 33 is specifically arranged to judge whether a number of saved notification messages is not smaller than the number of notifications. If the number of the saved notification messages is not smaller than the number of notifications, the sending module 33 sends a latest generated notification message in the saved notification messages. Or, when the notification time length is not empty but the number of notifications is empty, the sending module 33 is specifically arranged to judge whether saving time of notification messages is not smaller than the notification time length. If the saving time of the notification messages is not smaller than the notification time length, the sending module 33 sends a latest generated notification message in the saved notification messages. Or, when the number of notifications and the notification time length are empty, the sending module 33 sends the notification message.

When the notification sending mode is the batch-processing sending mode, the sending module 33 is specifically arranged to, when the number of notifications and the notification time length are not empty, judge whether a number of saved notification messages is not smaller than the number of notifications, and judge whether saving time of the notification messages is not smaller than the notification time length. If the number of the saved notification messages is not smaller than the number of notifications or the saving time of the notification messages is not smaller than the notification time length, the sending module 33 sends the saved notification messages. Or, when the number of notifications is not empty but the notification time length is empty, the sending module 33 is specifically arranged to judge whether a number of saved notification messages is not smaller than the number of notifications. If the number of the saved notification messages is not smaller than the number of notifications, the sending module 33 sends the saved notification messages. Or, when the notification time length is not empty but the number of notifications is empty, the sending module 33 is specifically arranged to judge whether saving time of notification messages is not smaller than the notification time length. If the saving time of the notification messages is not smaller than the notification time length, the sending module 33 sends the saved notification messages. Or, when the number of notifications and the notification time length are empty, the sending module 33 sends the notification message.

It needs to be stated that the device may be arranged at a CSE.

Correspondingly, the acquisition module 31 is arranged to acquire the target resource information, the notification sending policy and the notification sending address from a subscribed resource creation request sent by an AE or another CSE.

Embodiment 3

Figure 4:
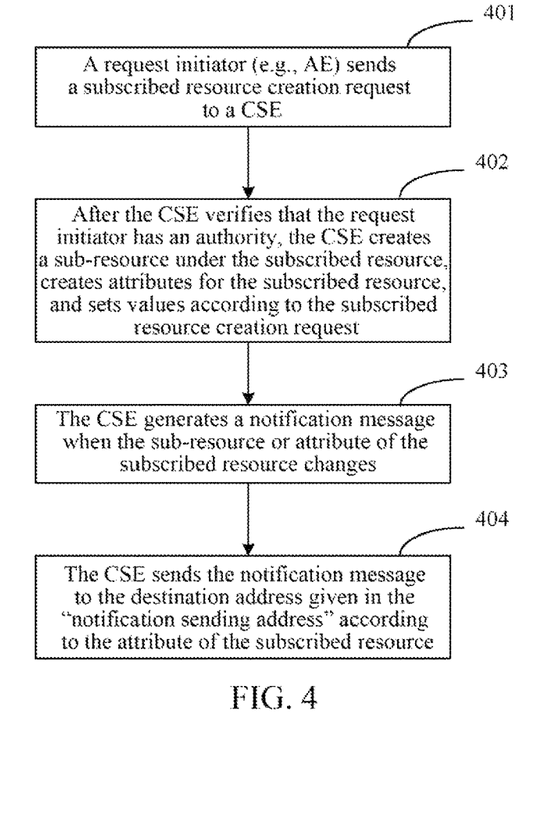
FIG. 4 illustrates a flowchart of a notification message sending method according to embodiment 3 of the present document.

This embodiment of the present document describes a scenario in which the method according to the embodiment is applied to a CSE. FIG. 4 illustrates a flowchart of a notification message sending method according to embodiment 3 of the present document. As illustrated in FIG. 4, the process includes the following steps.

In step 401, a request initiator (e.g., AE) sends a subscribed resource creation request to a CSE.

In this embodiment, the subscribed resource creation request includes:

1) a notification sending address, i.e., a destination address to which a generated notification message will be sent;

2) a notification sending mode, which may be arranged to be normal, batching-processing sending or latest notification sending;

3) a number of notifications, which is used in combination with a specific notification sending mode;

4) a notification time length, which is used in combination with a specific notification sending mode; and 5) a subscribed resource address, i.e., an address of a target resource whose change needs to be tracked.

For example, the subscribed resource creation request specifically includes:

resource name: "mySubscription";
resource type: "Subscription";
create to: \\CSEBase\myApplication; and
content.

Herein, the content may include names and values of the following parameters:

the notification sending address, a value of which is a Universal Resource Identifier URI and is used for indicating a destination address to which a notification message is sent;

the notification sending module, which may be arranged to be normal, batch-processing sending or latest notification sending;

the number of notifications, which is used in combination with a specific notification sending mode; and the notification time length, which is used in combination with a specific notification sending mode.

It needs to be stated that the above-mentioned all or partial parameters may also be carried by other requests or messages, or are acquired by the CSE through other ways.

In step 402, after the CSE verifies that the request initiator has an authority of creating a subscribed resource for the subscribed resource, the CSE creates a sub-resource, i.e., subscribed resource, under the subscribed resource, creates attributes "notification sending address", "notification sending mode", "the number of notifications" and "notification time length" for the subscribed resource, and sets values thereof to be values of corresponding attributes in the subscribed resource creation request.

For example, after the CSE receives the resource creation request from the AE, the CSE verifies that the AE has an authority of creating a resource, creates a sub-resource "mySubscription" under the resource "myApplication", sets the attribute "notification sending mode" to be the value of the notification sending mode in the request message, sets the attribute "the number of notifications" to be the value of the number of notifications in the request message, sets the attribute "notification time length" to be the value of the notification time length in the request message and set the attribute "notification sending address" to be the value of the notification sending address in the request message. At this moment, the resource "myApplication" is called as the subscribed resource.

In step 403, the CSE generates a notification message when the sub-resource or attribute of the subscribed resource changes.

In this embodiment, when the attribute or sub-resource of the resource "myApplication" on the CSE changes, the CSE generates a notification message.

In step 404, the CSE sends the notification message to the destination address given in the "notification sending address" according to the attribute of the subscribed resource.

In this embodiment,

A first case: if the value of "notification sending mode" is "normal"

When the CSE checks that "the number of notifications" and "notification time length" are empty, once the CSE generates a notification message, the CSE sends the notification message to the destination address given in the "notification sending address".

When the CSE checks that "the number of notifications" and "notification time length" are not empty, the CSE checks whether a number of notification messages sent in a current time window (the length of the time window is the notification time length) exceeds the "the number of notifications". If no, the CSE sends the notification to the destination address given in the "notification sending address". If yes, the CSE stores the newly generated notification message.

It needs to be stated that the time window is a cyclic time window and is started when the subscribed resource generates a first notification message or is started when the subscribed resource is successfully created. The number of notification messages generated in the time window is counted after the time window is started. The time window is started again after the time is reached, and simultaneously notification messages are re-counted in the new time window.

The stored notification messages are sent after a next time window is started.

A second case: if the value of "notification sending mode" is "latest notification sending"

When the CSE checks that "the number of notifications" and "notification time length" are not empty, and any one of the following conditions is firstly satisfied, the CSE sends a latest generated notification message in the saved notification messages to the destination address in the "notification sending address".

A first condition is that the number of the saved notification messages reaches "the number of notifications".

A counter is used to count the number of notification messages which are saved by the CSE and are generated by the subscribed resource. When a notification message is generated and saved by the CSE each time, a value of the counter is increased by 1. When the value of the counter reaches the value of "the number of notifications", it is considered that this condition is satisfied. After the notification messages are sent, the counter is cleared to zero. After this round of sending is completed, a first notification which is subsequently generated is called as a first notification message, and counting is started again from this notification message.

A second condition is that the saving time of the notification messages reaches the "notification time length".

Starting from the moment that the first notification message is generated, a timer is used for timing. When a value of the timer reaches the "notification time length", it is considered that this condition is satisfied. After the notification messages are sent, the timer is cleared to zero. After this round of sending is completed, a first notification which is subsequently generated is called as a first notification message, and timing is started again from this notification message.

In an implementation process, the counter and the timer may also use downward counting and downward timing modes. Initial values are set to be the values of "the number of notifications" and "notification time length", condition satisfaction is correspondingly changed to the condition that the value of the counter or the timer reaches 0, and zero clearing is also correspondingly changed to restoring to the initial values.

For the above-mentioned two conditions, when any one is firstly satisfied, the counter which is counting or the timer which is timing in the other condition should be reset, i.e., cleared to zero or restored to the initial values.

When the CSE checks that "the number of notifications" is not empty but the "notification time length" is empty, and when the number of the saved notification messages reaches "the number of notifications", the CSE sends a latest generated notification message in the saved notification messages to the destination address in the "notification sending address".

When the CSE checks that the "notification time length" is not empty but "the number of notifications" is empty, and when the saving time of the notification messages reaches the "notification time length", the CSE sends a latest generated notification message in the saved notification messages to the destination address in the "notification sending address".

A Third case: if the value of "notification sending mode" is "batch-processing sending"

When the CSE checks that "the number of notifications" and "notification time length" are not empty and any one of the following conditions is firstly satisfied, the CSE sends the saved notification messages to the destination address in the "notification sending address".

A first condition is that the number of the saved notification messages reaches "the number of notifications".

A second condition is that the saving time of the notification messages reaches the "notification time length".

When the CSE checks that "the number of notifications" is not empty but the "notification time length" is empty, and when the number of the saved notification messages reaches "the number of notifications", the CSE sends the saved notification messages to the destination address in the "notification sending address".

When the CSE checks that the "notification time length" is not empty but "the number of notifications" is empty, and when the saving time of the notification messages reaches the "notification time length", the CSE sends the saved notification messages to the destination address in the "notification sending address".

In this embodiment, when the destination address indicated by the "notification sending address" is not reachable, if the value of the "notification sending mode" is "normal", the CSE neglects notification messages generated before the destination address is reachable;

if the value of the "notification sending mode" is "latest notification sending", the CSE saves the generated notification messages, and once the destination address is reachable, the CSE sends a latest generated notification message in the saved notification messages to the destination address in the "notification sending address"; and if the value of the "notification sending mode" is "batch-processing sending", the CSE saves the generated notification messages, and once the destination address is reachable, the CSE sends the saved notification messages to the destination address in the "notification sending address".

The embodiment of the present document further correspondingly provides a computer storage medium storing computer-executable instructions used for implementing the notification message sending method.

It needs to be stated that various modules in the embodiments of the present document may be implemented through a Central Processing Unit CPU, a Digital Signal Processor DSP or a Field Programmable Gate Array FPGA in an electronic device.

One skilled in the art should understand that the embodiments of the present document may be provided in the form of methods, systems or computer program products. Therefore, the present document may adopt the form of full hardware embodiments, full software embodiments or combined software and hardware embodiments. In addition, the present document may adopt the form of computer program products implemented based on one or more of computer usable memory media (including but not limited to disk memories, optical memories, etc.) containing computer usable program codes therein.

The present document is described by referring to flowcharts and/or block diagrams of the method, the apparatus (system) and the computer program product according to the embodiments of the present document. It should be understood that each process and/or block in the flowcharts and/or block diagrams and combinations of processes and/or blocks in the flowcharts and/or block diagrams may be implemented through computer program instructions. These computer program instructions may be provided to processors of general-purpose computers, special-purpose computers, embedded computers or other programmable data processing devices to produce a machine, such that instructions executed through processors of computers or other programmable data processing devices produce apparatuses for implementing functions designated in one process or more processes of the flowcharts and/or one block or more blocks of the block diagrams.

These computer program instructions may also be stored in computer-readable memories which can boot computers or other programmable data processing devices to work in a specific manner, such that the instructions stored in the computer-readable memories produce products including instruction devices, and the instruction devices realize functions designated in one process or more processes of the flowcharts and/or one block or more blocks of the block diagrams.

These computer program instructions may also be loaded to computers or other programmable data processing devices, such that a series of operation steps are executed on the computers or other programmable devices to generate processing realized by the computers. Therefore, the instructions which are executed on the computers or other programmable devices provide steps for realizing functions designated in one process or more processes of the flowcharts and/or one block or more blocks of the block diagrams.

The above-mentioned embodiments are just embodiments of the present document and are not used for limiting the protection scope of the present document.

I claim:

1. A notification message sending method, comprising:
acquiring target resource information, a notification sending policy and a notification sending address;
generating a corresponding notification message when a target resource changes; and
sending the notification message to the notification sending address according to the notification sending policy;
wherein the notification sending policy comprises one or more of the following: a notification sending mode, a number of notifications and a notification time length;
wherein the notification sending mode is a normal mode, and said sending the notification message to the notification sending address according to the notification sending policy comprises:
when the number of notifications and the notification time length are not empty, judging whether a number of notification messages sent in a current time window exceeds the number of notifications, and if no, sending the notification message; and if yes, sending the notification message in a next time window, wherein a length of the time window is the notification time length;
or,
wherein the notification sending mode is a latest notification sending mode, after generating the corresponding notification message, the method further comprises: storing the notification message;
and said sending the notification message to the notification sending address according to the notification sending policy comprises:
when the number of notifications and the notification time length are not empty, judging whether a number of saved notification messages is not smaller than the number of notifications, and judging whether saving time of the notification messages is not smaller than the notification time length, and if the number of the saved notification messages is not smaller than the number of notifications, or the saving time of the notification messages is not smaller than the notification time length, sending a latest generated notification message in the saved notification messages; or
when the number of notifications is not empty but the notification time length is empty, judging whether a number of saved notification messages is not smaller than the number of notifications, and if the number of the saved notification messages is not smaller than the number of notifications, sending a latest generated notification message in the saved notification messages; or
when the notification time length is not empty but the number of notifications is empty, judging whether saving time of notification messages is not smaller than the notification time length, and if the saving time of the notification messages is not smaller than the notification time length, sending a latest generated notification message in the saved notification messages;
or,
wherein the notification sending mode is a batch-processing sending mode, after generating the corresponding notification message, the method further comprises: storing the notification message;
and said sending the notification message to the notification sending address according to the notification sending policy comprises:
when the number of notifications and the notification time length are not empty, judging whether a number of saved notification messages is not smaller than the number of notifications, and judging whether saving time of the notification messages is not smaller than the notification time length, and if the number of the saved notification messages is not smaller than the number of notifications or the saving time of the notification messages is not smaller than the notification time length, sending the saved notification messages; or
when the number of notifications is not empty but the notification time length is empty, judging whether a number of saved notification messages is not smaller than the number of notifications, and if the number of the saved notification messages is not smaller than the number of notifications, sending the saved notification messages; or
when the notification time length is not empty but the number of notifications is empty, judging whether saving time of notification messages is not smaller than the notification time length, and if the saving time of the notification messages is not smaller than the notification time length, sending the saved notification messages.

2. The method according to claim 1, wherein the method is applied to a Common Service Entity, CSE, and
said acquiring target resource information, a notification sending policy and a notification sending address comprises:
acquiring, by the CSE, the target resource information, the notification sending policy and the notification sending address from a subscribed resource creation request sent by an Application Entity, AE, or another CSE.

3. A notification message sending device, comprising hardware performing instructions stored in a non-transitory computer readable medium which executes following steps:
acquiring target resource information, a notification sending policy and a notification sending address;
generating a corresponding notification message when a target resource changes; and
sending the notification message to the notification sending address according to the notification sending policy;
wherein the notification sending policy comprises one or more of the following: a notification sending mode, a number of notifications and a notification time length;
wherein the notification sending mode is a normal mode, and said sending the notification message to the notification sending address according to the notification sending policy comprise:
when the number of notifications and the notification time length are not empty, judging whether a number of notification messages sent in a current time window exceeds the number of notifications, and if no, sending the notification message; and if yes, sending the notification message in a next time window, wherein a length of the time window is the notification time length;
or,
wherein the notification sending mode is a latest notification sending mode,
after generating the corresponding notification message, storing the notification message; said sending the notification message to the notification sending address according to the notification sending policy comprises:

when the number of notifications and the notification time length are not empty, judging whether a number of saved notification messages is not smaller than the number of notifications, and judging whether saving time of the notification messages is not smaller than the notification time length, and if the number of the saved notification messages is not smaller than the number of notifications or the saving time of the notification messages is not smaller than the notification time length, sending a latest generated notification message in the saved notification messages; or when the number of notifications is not empty but the notification time length is empty, judging whether a number of saved notification messages is not smaller than the number of notifications, and if the number of the saved notification messages is not smaller than the number of notifications, sending a latest generated notification message in the saved notification messages; or when the notification time length is not empty but the number of notifications is empty, judging whether saving time of notification messages is not smaller than the notification time length, and if the saving time of the notification messages is not smaller than the notification time length, sending a latest generated notification message in the saved notification messages;

or, wherein the notification sending mode is a batch-processing sending mode, after generating the corresponding notification message, storing the notification message; and said sending the notification message to the notification sending address according to the notification sending policy comprises:

when the number of notifications and the notification time length are not empty, judging whether a number of saved notification messages is not smaller than the number of notifications, and whether saving time of the notification messages is not smaller than the notification time length, and if the number of the saved notification messages is not smaller than the number of notifications or the saving time of the notification messages is not smaller than the notification time length, sending the saved notification messages; or when the number of notifications is not empty but the notification time length is empty, judging whether a number of saved notification messages is not smaller than the number of notifications, and if the number of the saved notification messages is not smaller than the number of notifications, sending the saved notification messages; or when the notification time length is not empty but the number of notifications is empty, judging whether saving time of notification messages is not smaller than the notification time length, and if the saving time of the notification messages is not smaller than the notification time length, sending the saved notification messages.

4. The device according to claim 3, wherein the device is arranged at a CSE, and said acquiring target resource information, a notification sending policy and a notification sending address comprises:

acquiring the target resource information, the notification sending policy and the notification sending address from a subscribed resource creation request sent by an AE or another CSE.

5. A non-transitory computer storage medium storing computer-executable instructions, wherein, the computer-executable instructions are used for implementing the method according to claim 1.

* * * * *